Patented June 3, 1947

2,421,378

UNITED STATES PATENT OFFICE 2,421,378

ETHERS OF ESTERS OF LACTIC ACID

Howard R. Guest, Charleston, W. Va., Louis G. MacDowell, Lakeland, Fla., and Raymond W. McNamee, South Charleston, W. Va., assignors to Carbide and Carbon Chemicals Corporation, a corporation of New York No Drawing. Application June 27, 1944, Serial No. 542,442

7 Claims. (Cl. 260—484)

An improved synthesis of ethers of lactic acid (2-hydroxypropionic acid) esters is the particular subject of this invention.

We have discovered that the di-acetals of pyruvic aldehyde will rearrange on heating in the presence of an acid catalyst and an alcohol to form ethers of lactic acid esters. The overall rearrangement may be illustrated as follows, where R is an alkyl, or substituted alkyl radical, such as an alkoxyalkyl, aroxyalkyl or aralkyl radical:

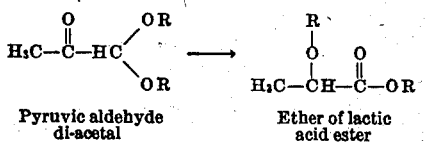

| Pyruvic aldehyde di-acetal | Ether of lactic acid ester |

The rearrangement occurs most readily at temperatures above 100° C. and it is catalyzed by acids, such as hydrochloric, sulfuric, phosphoric and sulfonic acids. The rearrangement is favored by the presence of the alcohol corresponding to the alkyl or substituted alkyl group of the acetal. Suitable alcohols include the alkanols, alkoxyalkanols, and aromatic alcohols, such as benzyl alcohol. Thus, any di-acetal of pyruvic aldehyde may be subjected to this rearrangement, and a number of suitable pyruvic aldehyde di-acetals are described in our copending application Serial No. 518,304, filed January 14, 1944, of which this application is a continuation-in-part. Such acetals and the ether of lactic ester to which they rearrange are listed below:

| Pyruvic Aldehyde Di-acetal | Ether of Lactic Acid Ester |
|---|---|
| Pyruvic aldehyde diethyl acetal | Ethyl 2-ethoxypropionate |
| Pyruvic aldehyde di-isopropyl acetal | Isopropyl 2-isopropoxypropionate |
| Pyruvic aldehyde dibutyl acetal | Butyl 2-butoxypropionate |
| Pyruvic aldehyde di(2-ethylhexyl) acetal | 2-Ethylhexyl 2-(2-ethylhexoxy)-propionate |
| Pyruvic aldehyde dilauryl acetal | Lauryl 2-lauroxypropionate |
| Pyruvic aldehyde dimethoxyethyl acetal | Methoxyethyl 2-methoxyethoxypropionate |
| Pyruvic aldehyde di(beta-chlorethyl acetal) | Beta-chlorethyl alpha-beta-chlorethoxypropionate |

Many of the lactic acid ether-esters are new chemical compounds, and have valuable properties as high-boiling solvents and plasticizers for vinyl resins and cellulose esters and ethers. Their physical constants are very close to those of the pyruvic aldehyde di-acetals from which they are derived, and it is desirable to carry the rearrangement to a high yield so as to avoid difficulties in separation. A high yield is facilitated by the fact that the rearrangement does not appear to be a reversible one. Since the lactic acid ether-esters are more resistant to hydrolysis than the pyruvic aldehyde di-acetals, separation may be effected by selective acid hydrolysis of the di-acetal followed by fractional distillation of the more volatile pyruvic aldehyde and alcohols. The lactic acid ether-esters may also be worked up in the form of the lactic acid ether by saponification of the ester with alcoholic alkali metal hydroxide, followed by liberation of the lactic acid ether from its salt by the addition of a mineral acid. For many purposes, however, a small amount of the di-acetal would not interfere with the intended uses of the lactic acid ether-esters, as for solvents and plasticizers.

The lactic acid ether-esters may also be made directly from pyruvic aldehyde (methyl glyoxal) and an alcohol, by forming the pyruvic aldehyde di-acetal under such conditions that it rearranges to a lactic acid ether-ester. Suitable conditions for this purpose comprise carrying out the reaction at a temperature above 100° C., preferably about 150° C., in the presence of an acid catalyst and more than two mols of the alcohol per mol of pyruvic aldehyde. When the lactic acid ether-esters are freed from pyruvic aldehyde di-acetals by selective acid hydrolysis, the pyruvic aldehyde and alcohols may be recovered and re-used in the reaction.

The following examples will illustrate the process details of the invention:

*Example 1.—Rearrangement of pyruvic aldehyde dibutyl acetal to butyl 2-butoxypropionate*

A mixture containing 400 grams of pyruvic aldehyde dibutyl acetal, 400 grams of normal butanol, and 1 cc. of concentrated sulfuric acid was heated for four hours at 130° C. Five grams of sodium acetate were then added and the mixture was subjected to fractional distillation at a pressure of 10 mm. of mercury. A product having a boiling temperature of 101° C. at 10 mm., a specific gravity of 0.903 at 20° C., and a refractive index of 1.4175 at 20° C. was obtained. This product was approximately 95% pure, and was obtained with an efficiency of 85%. It was identified as butyl 2-butoxypropionate by saponification of the ester with alcoholic potassium hydroxide, and liberation of 2-butoxypropionic acid from its salt by the addition of sulfuric acid. 2-butoxypropionic acid has the following physical constants: boiling point 114° C. (10 mm.); specific gravity at 20° C., 0.984; refractive index at 20° C., 1.4224.

*Example 2.—Formation of butyl 2-butoxypropionate from pyruvic aldehyde and butanol*

An aqueous solution of pyruvic aldehyde containing 623 grams of the aldehyde (8.65 mols) was heated at about 140° C. with 2960 grams of butanol (40 mols) in the presence of four grams of sulfuric acid. A mixture of water and butanol was distilled off, the distillate condensed, and the butanol layer returned to the reaction. At the end of the reaction, 1115 grams of butyl 2-butoxypropionate were obtained, representing a yield of 64%. Pyruvic aldehyde dibutyl acetal and pyruvic aldehyde dibutyl acetal dibutyl ketal were also obtained in amounts of 225 grams and 140 grams respectively.

*Example 3.—Formation of 2-ethylhexyl 2(2-ethylhexoxy)-propionate from pyruvic aldehyde and 2-ethylhexanol*

An aqueous solution containing 360 grams of pyruvic aldehyde was charged to a distillation kettle along with 2600 grams of 2-ethylhexanol, 660 grams of benzene and 4 grams of sulfuric acid. The contents of the kettle were heated to 150° C. and water was removed as its azeotropic distillate with benzene and the alcohol. After separation of the water layer, the alcohol and benzene were returned to the distillation flask. At the end of the reaction, 500 grams of 2-ethylhexyl 2-(2-ethylhexoxy)-propionate and 500 grams of pyruvic aldehyde di(2-ethylhexyl) acetal were obtained. The acetal had a boiling point of 140° C. at 1.5 mm., a specific gravity at 20° C., of 0.882 and a refractive index at 20° C. of 1.4369, and the physical constants of the ester were practically identical. The corresponding acid of the ester, 2-(2-ethylhexoxy)-propionic acid was separated by saponification and acidulation and found to have the following constants: boiling point 111° C. at 1.3 mm.; specific gravity at 20° C., 0.938; refracitve index at 20° C., 1.4346.

The illustrated processes are also suitable for the rearrangement of other pyruvic aldehyde diacetals to lactic acid ether-esters.

We claim:

1. Process for making ethers of lactic acid esters which comprises heating a pyruvic aldehyde di-acetal at a temperature above 100° C., in the presence of an acid catalyst and an alcohol, and recovering an ether of a lactic acid ester from the reaction products.

2. Process for making alkyl 2-alkoxypropionates which comprises heating a pyruvic aldehyde dialkyl acetal at a temperature above 100° C. in the presence of an acid catalyst and an alkanol, and recovering an alkyl 2-alkoxypropionate from the reaction products.

3. Process for making butyl 2-butoxypropionate which comprises heating pyruvic aldehyde dibutyl acetal at a temperature above 100° C. in the presence of an acid catalyst and butanol, and recovering butyl 2-butoxypropionate from the reaction products.

4. Process for making ethers of lactic acid esters which comprises heating pyruvic aldehyde and an alcohol in the presence of an acid catalyst at a temperature above 100° C., the molar ratio of the alcohol to pyruvic aldehyde being greater than two.

5. Process for making alkyl 2-alkoxypropionates which comprises heating pyruvic aldehyde and an alkanol in the presence of an acid catalyst at a temperature above 100° C., the molar ratio of the alkanol to pyruvic aldehyde being greater than two.

6. Process for making butyl 2-butoxypropionate which comprises heating pyruvic aldehyde with butanol in the presence of an acid catalyst at a temperature above 100° C., the molar ratio of butanol to pyruvic aldehyde being greater than two.

7. Process for making 2-ethylhexyl 2-(2-ethylhexoxy)-propionate which comprises heating pyruvic aldehyde with 2-ethylhexanol in the presence of an acid catalyst at a temperature above 100° C., the molar ratio of 2-ethylhexanol to pyruvic aldehyde being greater than two.

HOWARD R. GUEST.
LOUIS G. MacDOWELL.
RAYMOND W. McNAMEE.

REFERENCES CITED

The following references are of record in the file of this patent:

UNITED STATES PATENTS

| Number | Name | Date |
| --- | --- | --- |
| 2,265,946 | Loder | Dec. 9, 1941 |

OTHER REFERENCES

Henze et al., "Jour. Am. Chem. Soc.," vol. 55 (1933) pp. 4255–9.